(12) United States Patent
Okojie

(10) Patent No.: US 10,067,025 B1
(45) Date of Patent: Sep. 4, 2018

(54) MODULAR APPARATUS AND METHOD FOR ATTACHING MULTIPLE DEVICES

(71) Applicant: The United States of America as represented by the Administrator of the National Aeronautics and Space Administration, Washington, DC (US)

(72) Inventor: Robert S. Okojie, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 165 days.

(21) Appl. No.: 14/698,018

(22) Filed: Apr. 28, 2015

Related U.S. Application Data

(63) Continuation of application No. 13/524,327, filed on Jun. 15, 2012, now Pat. No. 9,046,426.

(51) Int. Cl.
*G01L 19/14* (2006.01)
*G01L 19/06* (2006.01)

(52) U.S. Cl.
CPC ........ *G01L 19/0681* (2013.01); *G01L 19/147* (2013.01)

(58) Field of Classification Search
CPC ............................ G01L 19/0618; G01L 19/147
See application file for complete search history.

(56) References Cited

U.S. PATENT DOCUMENTS

| | | | |
|---|---|---|---|
| 5,661,647 A * | 8/1997 | Washburn | H02M 3/00 363/147 |
| 6,255,728 B1 | 7/2001 | Nasiri et al. | |
| 6,564,644 B1 | 5/2003 | Kurtz | |
| 6,624,003 B1 | 9/2003 | Rice | |
| 6,649,994 B2 | 11/2003 | Parsons | |
| 7,265,429 B2 | 9/2007 | Wan | |
| 7,307,325 B2 | 12/2007 | Kurtz et al. | |
| 7,363,820 B2 | 4/2008 | Kurtz et al. | |
| 7,538,401 B2 | 5/2009 | Eriksen et al. | |
| 7,642,115 B2 | 1/2010 | Eriksen et al. | |
| 7,861,595 B2 | 1/2011 | Brown et al. | |
| 7,900,521 B2 * | 3/2011 | Hooper | G01L 19/0084 73/756 |
| 7,938,014 B2 | 5/2011 | Meehan et al. | |
| 7,952,154 B2 | 5/2011 | Guo et al. | |
| 7,963,154 B2 | 6/2011 | Obermeier et al. | |
| 8,001,844 B2 | 8/2011 | Fricke et al. | |
| 8,013,405 B2 | 9/2011 | Eriksen et al. | |
| 8,069,730 B2 | 12/2011 | Kurtz et al. | |
| 8,077,447 B2 | 12/2011 | Higashi et al. | |
| 2003/0042996 A1* | 3/2003 | Ono | H01P 1/2136 333/134 |

(Continued)

*Primary Examiner* — Robert R Raevis
(74) *Attorney, Agent, or Firm* — Robert H. Earp, III; William M. Johnson

(57) ABSTRACT

A modular apparatus for attaching sensors and electronics is disclosed. The modular apparatus includes a square recess including a plurality of cavities and a reference cavity such that a pressure sensor can be connected to the modular apparatus. The modular apparatus also includes at least one voltage input hole and at least one voltage output hole operably connected to each of the plurality of cavities such that voltage can be applied to the pressure sensor and received from the pressure sensor.

5 Claims, 11 Drawing Sheets

(56) References Cited

U.S. PATENT DOCUMENTS

2006/0240586 A1\* 10/2006 Kobayashi ............ H01J 37/224
  438/26
2007/0211108 A1\* 9/2007 Enomoto ............. B41J 2/14233
  347/50

\* cited by examiner

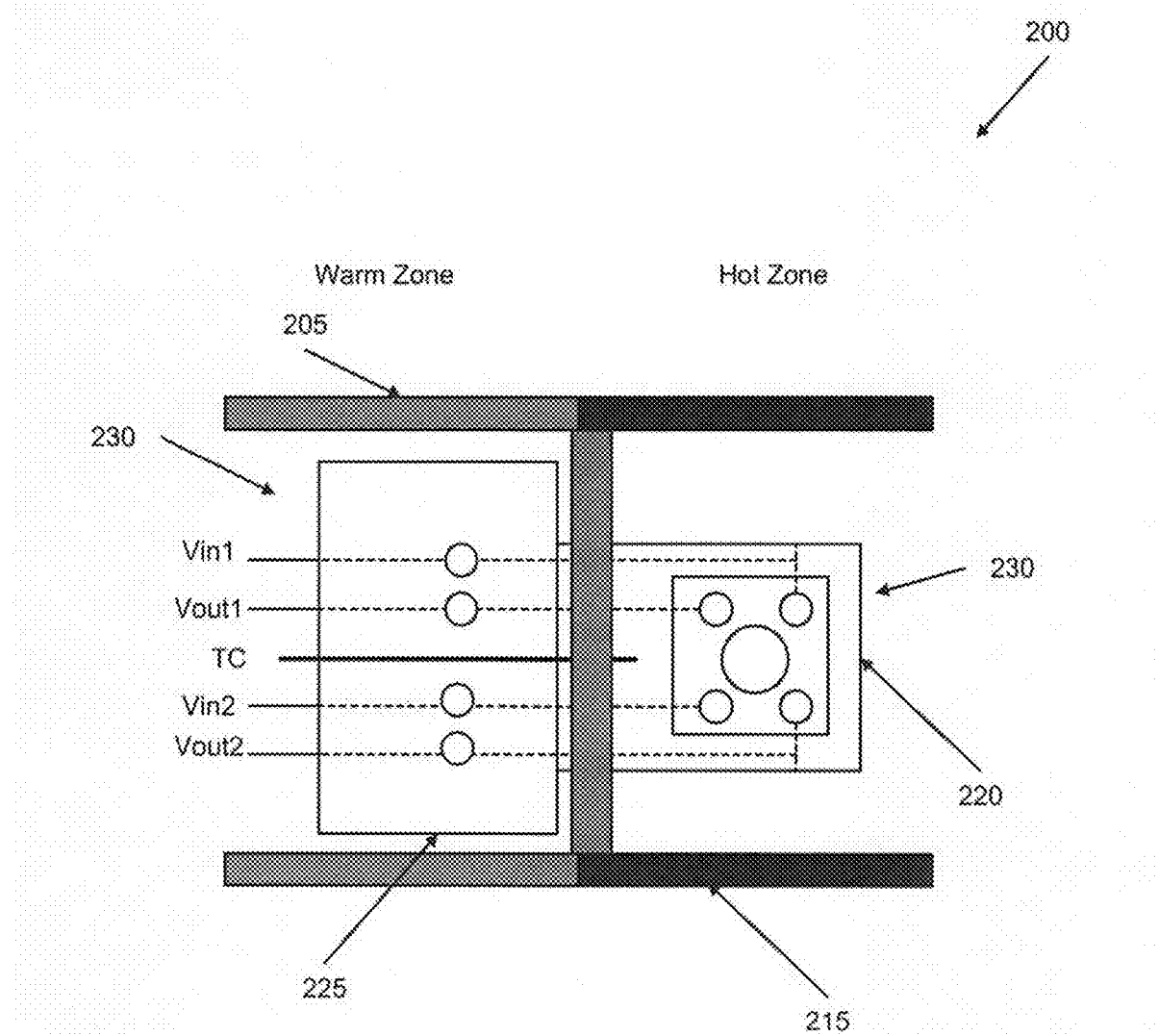

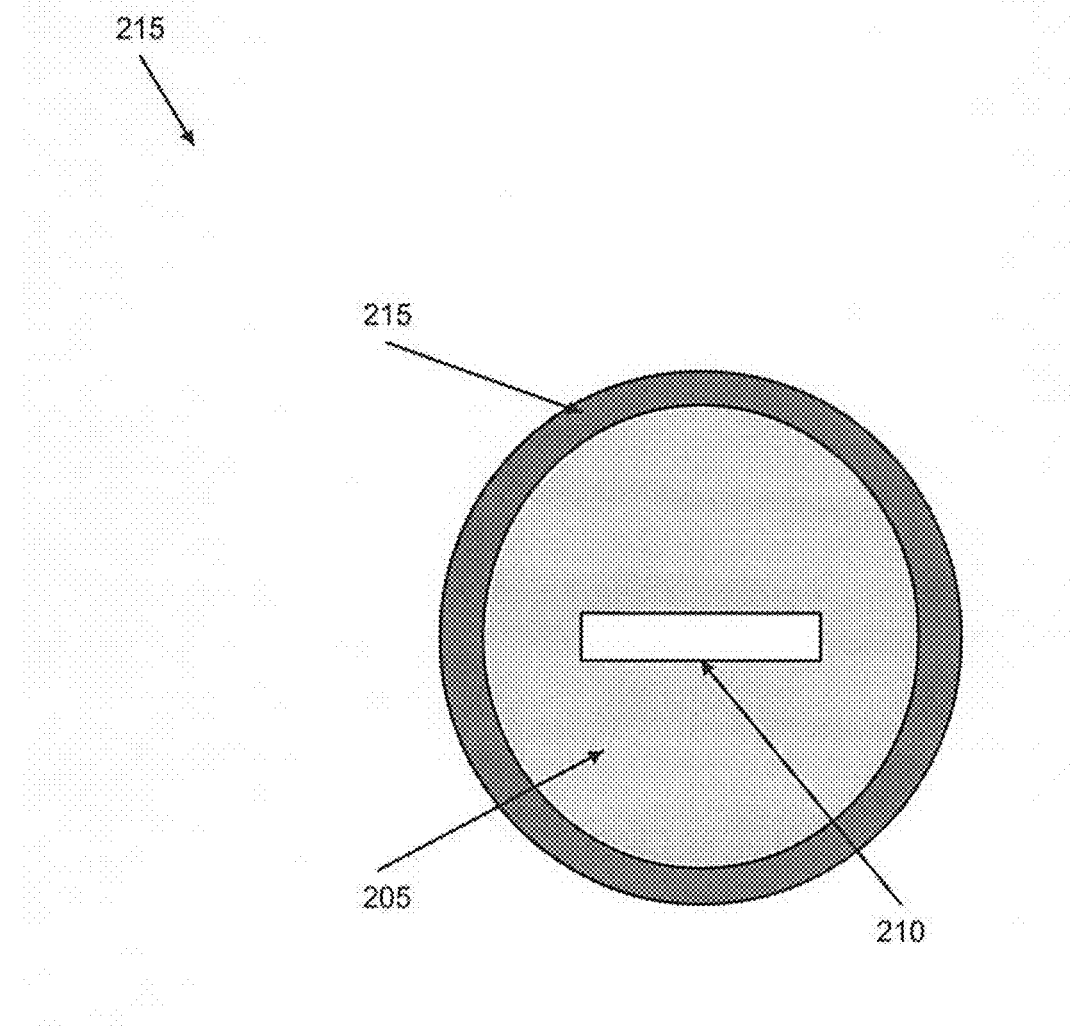

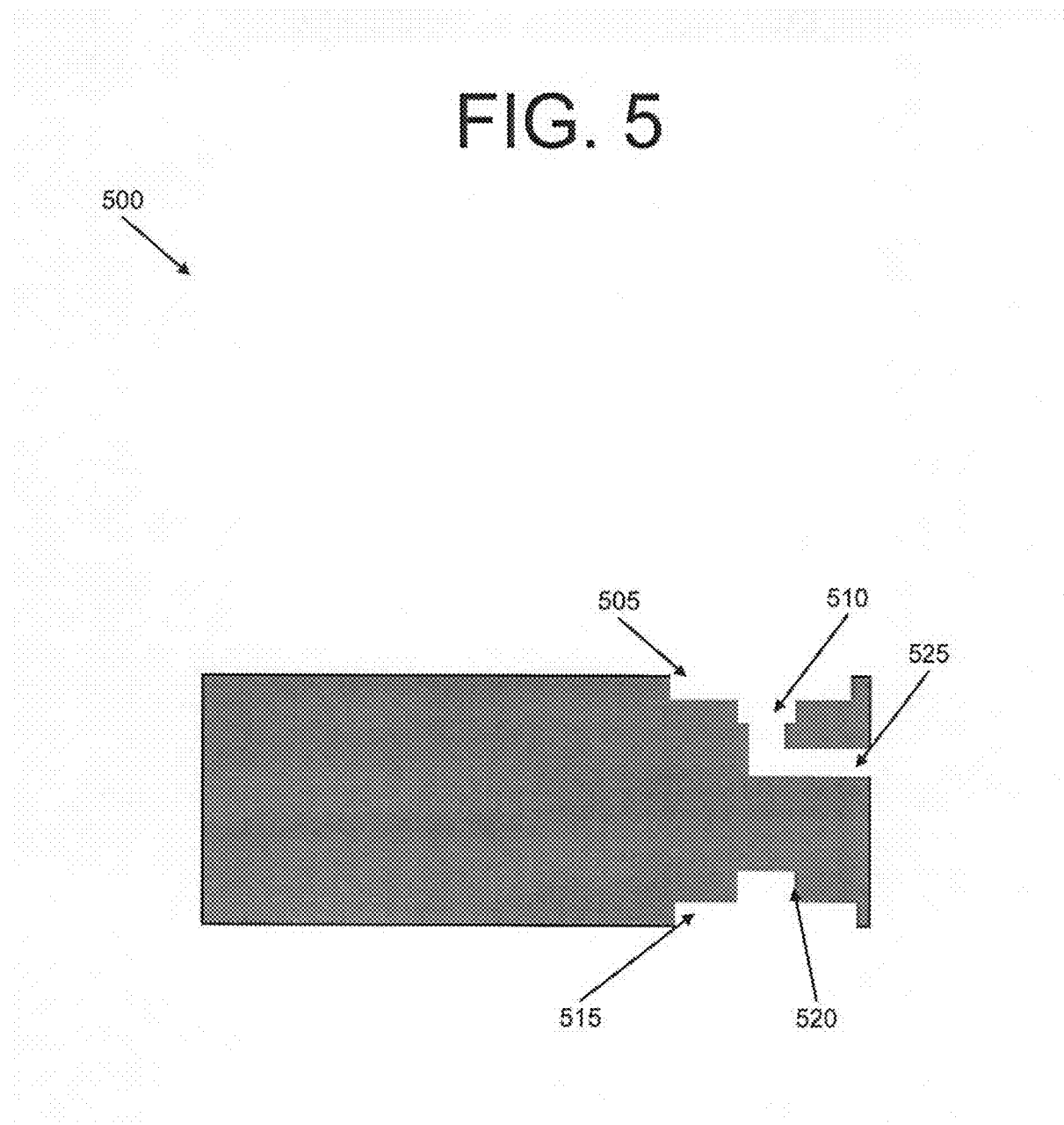

MODULAR APPARATUS AND METHOD FOR ATTACHING MULTIPLE DEVICES

RELATED U.S. APPLICATION

This Application is a continuation of U.S. patent application Ser. No. 13/524,327, entitled "Modular Apparatus and Method for Attaching Multiple Devices", filed on Jun. 15, 2012, and Issued on Jun. 2, 2015 as U.S. Pat. No. 9,046,426.

ORIGIN OF THE INVENTION

The invention described herein was made by an employee of the United States Government and may be manufactured and used by or for the Government for Government purposes without the payment of any royalties thereon or therefore.

FIELD

The present invention relates to a modular electronic package, and more particularly, to an apparatus and method for hermetic and non-hermetic multifunctional packaging of high temperature and low temperature operating electronics and sensing devices.

BACKGROUND

There is growing demand for improved efficient management of energy consumption in jet engines and automobiles and the global reduction of undesirable emission of hydrocarbons and other combustion by-products, such as Nitrogen oxide (NOx) and Carbon Monoxide (CO). Semiconductor-based sensors and electronics targeted for insertion in high temperature, extreme vibration, and corrosive media must satisfy a set of minimum reliability criteria before becoming acceptable for operational use. In addition, it is crucial to validate the Computational Fluid Dynamics (CFD) codes generated for flow fields and turbulence conditions inside engines. Non-validation of these codes renders them untrustworthy for use in future engine designs.

Devices (sensors and electronics) capable of functioning in these harsh environments need the appropriate package to sustain stable and reliable operation during the life cycle of these devices. Package reliability problems have largely contributed to prevent the practical application of these devices. The temperature of the instrumentation environment is typically greater than 300 degrees Celsius (° C.). Therefore, devices must survive and operate reliably beyond that temperature. This is very challenging since conventional semiconductor electronic and sensing devices are limited to operating in temperatures less than 300° C. due to the limitations imposed by the material properties and packaging. Silicon carbide (SiC)-based electronics and sensors have been demonstrated to operate at temperatures greater than 600° C., thereby offering the promise of direct insertion into such high temperature environments.

However, the lack of the device packaging methodologies appropriate for such harsh environments has affected the operational reliability and survivability of these devices. Economically, reliability problems at high temperature due to poor packaging have discouraged global application and large-scale commercialization. As a result, reliability problems have contributed to delay the much-anticipated early introduction of SiC devices into high temperature environments.

Generally, the primary methods of bonding the SiC sensor and the cover member are either by electrostatic bonding or by direct bonding using a glass flits. In the cover member, an aperture is drilled to serve as an escape path for gases during the curing of the bonding glass frits. The aperture is eventually sealed to provide hermetic sealing. The disadvantages of such a method include that the use of an electrostatic bonding method makes very weak bond strength between the SiC sensor and the SiC cover member. This may lead to debonding during thermal cycling, thereby rendering the device useless.

The application of glass fits as the adhesion material between the SiC cover member and the SiC sensor wafer also makes necessary the creation of an aperture as an escape path for outgassing during glass bonding. Since the aperture will have to be sealed later in order to maintain the desired hermetic reference cavity, creation of apertures increases the risk of the sealant slipping into the reference cavity. Because SiC has a very low oxidation rate, the SiC cover member must be heavily oxidized in order to create a thick oxide to envelope the SiC cover member to prevent electrical conduction during operation at high temperature. The oxidation process could take as long as twenty-four hours and may break down during a current or voltage surge. There are many components coupled together, which also raises problems of thermomechanically-induced stress on the sensor, thereby gradually degrading sensor performance.

However, the solutions associated with the above-mentioned problems have the operational limitation that they do not easily lend themselves for multifunctional applications.

SUMMARY

Certain embodiments of the present invention may provide solutions to the problems and needs in the art that have not yet been fully identified, appreciated, or solved by current packages. For example, one or more embodiments of the present invention pertain to a modular apparatus (or package) having a square recess that includes a plurality of cavities and a reference cavity. The modular apparatus also includes at least one voltage input hole and at least one voltage output hole operably connected to each of the plurality of cavities.

In one embodiment, an apparatus includes an elongated section including at least one square recess including a plurality of cavities and a reference cavity. The apparatus also includes a circular section that includes at least one voltage input hole and at least one voltage output hole. The at least one voltage input hole is operably connected to one of the plurality of cavities of the at least one square recess, and the at least one voltage output hole is operably connected to another one of the plurality of cavities of the at least one square recess.

In another embodiment, an apparatus includes a housing. The housing may be configured to house a modular package, and include a slot section configured to allow an elongated section of a modular package to extend into an environment.

In yet another embodiment, an apparatus includes an elongated section that includes at least one square recess configured to operably connect with at least one pressure sensor. The apparatus also includes a larger section with a plurality of voltage input and output holes operably connected to each cavity of the at least one square recess.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 2A illustrates an assembly package, according to an embodiment of the present invention.

FIG. 2B illustrates a cross-section of the assembly package, according to an embodiment of the present invention.

FIG. 5 illustrates a cross-section of a modular apparatus, according to an embodiment of the present invention.

DETAILED DESCRIPTION OF THE EMBODIMENTS

One or more embodiments of the present invention pertain to an apparatus that can simultaneously perform at least the following functions: accept one dynamic pressure sensor, accept one static pressure sensor, accept one temperature sensor, accept a signal conditioning circuit, accept buried connecting wires, and accept buried and attachable acoustic impedance channels. When these functions are implemented, the apparatus is configured to support the individual functions of the above. The apparatus may also provide environmental protection to electronics and sensors targeted for use in high temperature environments.

The basic components include a single substrate member of a dielectric material with thermomechanical properties similar, or closely similar, to those of a SiC substrate material (i.e., aluminum nitride). This substrate member may serve as a receiving platform for the above-mentioned functionality. The substrate member may also serve as protection for the sensors from harmful particulates in the high temperature environment. Because the substrate member is made of the same material with thermomechanical properties similar to those of the sensors, the problems of mismatch in the coefficient of thermal expansion (CTE) associated with the current packages are significantly reduced.

The apparatus may include four through holes spread equidistantly. These holes accept wires or pins that are used to make intimate contact with the contact pads on the sensor. A shallow circular or rectangular recess is located on one face of the top cover substrate known as an overpressure protection or reference cavity. The pins that are inserted into the through holes of the top cover substrate can be made of platinum, gold, nickel, or any other suitable conducting material. Various embodiments of the design can be considered. The apparatus may then be inserted into a slit made in a stainless steel header such that the extended section of the apparatus, carrying the pressure and temperature sensors, is on the hotter side. The other wider section of the package may reside on the cooler side of the stainless steel housing. The materials used may include, but are not limited to, aluminum nitride substrates, stainless steel, and Kovar®.

Figure 1A:
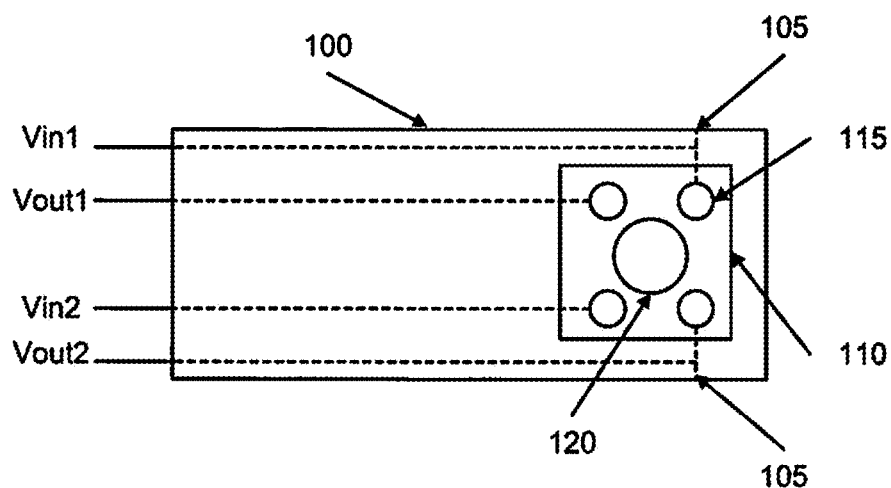
FIG. 1A illustrates a modular apparatus, according to an embodiment of the present invention.

FIG. 1A illustrates a modular apparatus 100, according to an embodiment of the present invention. Modular apparatus 100 may be made of ceramic material in certain embodiment. Modular apparatus 100 includes a square recess 110 with four equidistant contact cavities 115 and a pressure reference cavity 120. Square recess 110 allows a pressure sensor (not shown) to be attached to modular apparatus 100. It should be appreciated that modular apparatus 100 may include another square recess on the opposite side to allow a second sensor to be attached.

While this embodiment includes four equidistant contact cavities 115 that do not go through modular apparatus 100, other embodiments may include four equidistant contact cavities 115 that go through modular apparatus 100 to support a second sensor. It should also be appreciated that the number of contact cavities 115 may vary depending on the pressure sensor that is to be attached.

Modular apparatus 100 may also include two access (or side) holes 105 on each side of modular apparatus 100. For example, each side of modular apparatus 100 is drilled with two access holes 105 that connect with two of the four contact cavities 115. At the far end of modular apparatus 100, four voltage holes are provided, e.g., voltage in (or input) hole $V_{in1}$, voltage out (or output) hole $V_{out1}$, voltage in hole $V_{in2}$, and voltage out hole $V_{out2}$. Voltage in hole $V_{in1}$ and voltage out hole $V_{out2}$ are operably connected to two equidistant contact cavities 115 via access holes 105. Voltage out hole $V_{out1}$ and voltage in hole $V_{in2}$ are operably (or directly) connected to the other two remaining contact cavity holes 115. It should be appreciated that during operation of modular apparatus 100, access holes 105 may be sealed with high temperature glass or conductive paste such that current may pass from voltage in hole $V_{in1}$ to contact cavity 115 and current may be outputted at voltage out hole $V_{out1}$ from another equidistant diagonally aligned contact cavity 115.

In this embodiment, pressure reference cavity 120 has a depth that is shallower than the depth of each equidistant contact cavity 115. See, for example, FIG. 3D for a cross-section view of the modular apparatus. In other embodiments, pressure reference cavity 120 may go through the other side of modular apparatus 100 so another sensor can be attached to the other side of modular apparatus 100. Furthermore, pressure reference cavity 120 allows up and down movement of the diaphragm of the pressure sensor that is connected to modular apparatus 100.

Each hole in modular apparatus 100 may include a wire, a liquid conductor, conductive paste, or any conductive material that would be readily appreciated by a person of ordinary skill in the art. For example, a wire can be inserted in voltage in hole $V_{in1}$, a wire can be inserted in access hole 105, and a wire can be inserted in contact cavity 115 that connects with access hole 105. In the case of voltage out hole $V_{out1}$ and voltage in hole $V_{in2}$, the wires will protrude to their respective contact cavities 115. These wires, when connected to each other, can provide an electric connection in order for the sensor to function when the sensor is attached to square recess 110. Once the wires are connected, such that an electric current can be realized, access holes 105 may be sealed. Because the connected wires form a completed circuit, this configuration allows voltage to be measured at voltage out holes $V_{out1}$ and $V_{out2}$ when voltage is placed across voltage in holes $V_{in1}$ and $V_{in2}$.

Figure 1B:
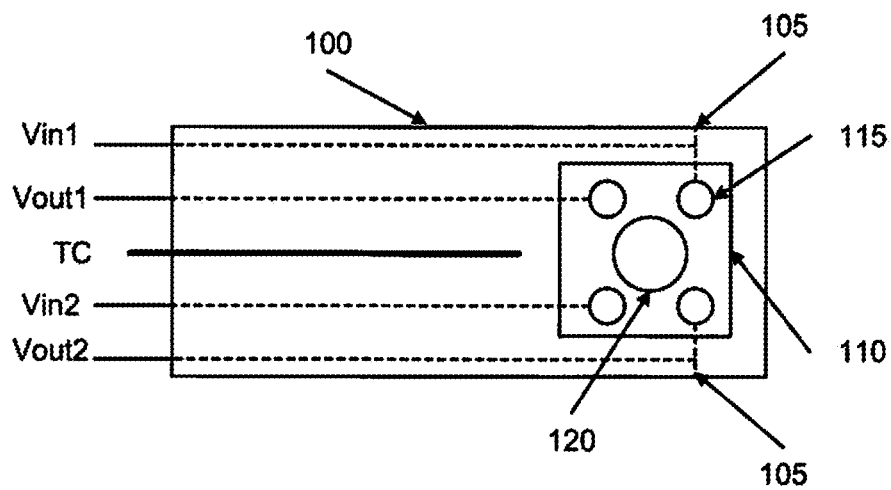
FIG. 1B illustrates a modular apparatus with a buried thermocouple, according to an embodiment of the present invention.

In FIG. 1B, modular apparatus 100 may include a buried thermocouple hole TC that is parallel to the other voltage holes discussed above. In this embodiment, thermocouple hole TC may not protrude through square recess 110, but instead thermocouple hole TC terminates before protruding through square recess 110. This configuration allows temperature of modular apparatus 100, or any other unit connected to modular apparatus 100, to be measured during operation.

Figure 1C:
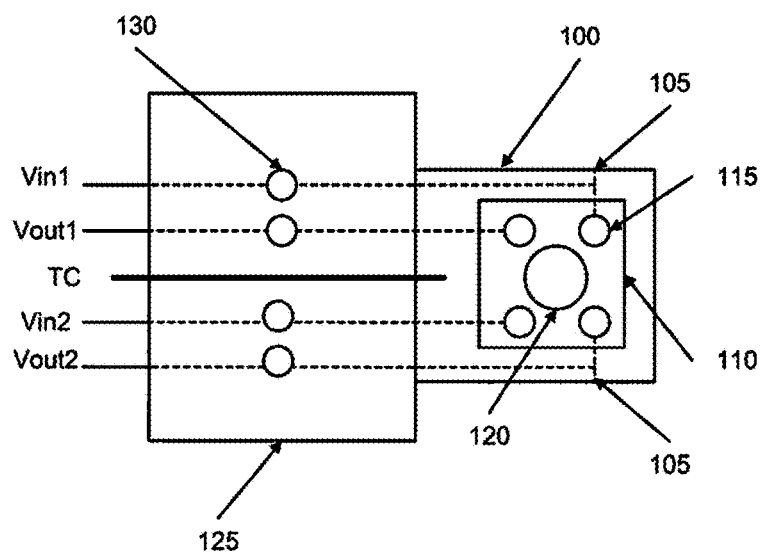
FIG. 1C illustrates a modular apparatus with access points and surface for attaching signal conditioning integrated circuit (IC), according to an embodiment of the present invention.

In FIG. 1C, modular apparatus 100 includes an IC block 125 with four IC holes 130 that connect with voltage in and out holes $V_{in1}$, $V_{out1}$, $V_{in2}$, and $V_{out2}$. This configuration allows IC holes 130 to interconnect from the sensor to IC block 125. Similarly, an electrical wire, or any conductive material or paste, can be inserted through each IC hole 130 such that an electrical connection can be formed when contacting the wires running through voltage in and out holes $V_{in1}$, $V_{out1}$, $V_{in2}$, and $V_{out2}$. This allows a signal conditioning chip, when attached to modular apparatus 100, to receive power from voltage in holes $V_{in1}$ and $V_{in2}$ and the voltage output from the sensor may be received by the conditioning chip. It should be noted that in this embodiment, IC holes 130 might not protrude through modular apparatus 100. However, in other embodiments, IC holes 130 may protrude through modular apparatus 100 such that additional IC units (or conditioning chips) can be attached to modular apparatus 100 to condition the sensor. Depending on the conditioning chip being attached to modular apparatus 100, IC holes 130 may be in any configuration.

It should be appreciated that modular apparatus 100, as shown in FIGS. 1A-C, provides a modular device that may include a sensor to dynamically sense pressure, a thermocouple to sense temperature, and an IC device to condition the temperature and pressure before the signal is outputted from modular apparatus 100. Such a configuration allows modular apparatus 100 to include or not include any of the above devices, or include additional devices depending on the locations of the holes within modular apparatus 100. For example, a signal conditioning chip may be mounted on modular apparatus 100 in close proximity (or as close as possible) to the pressure sensor device.

Figure 1D:
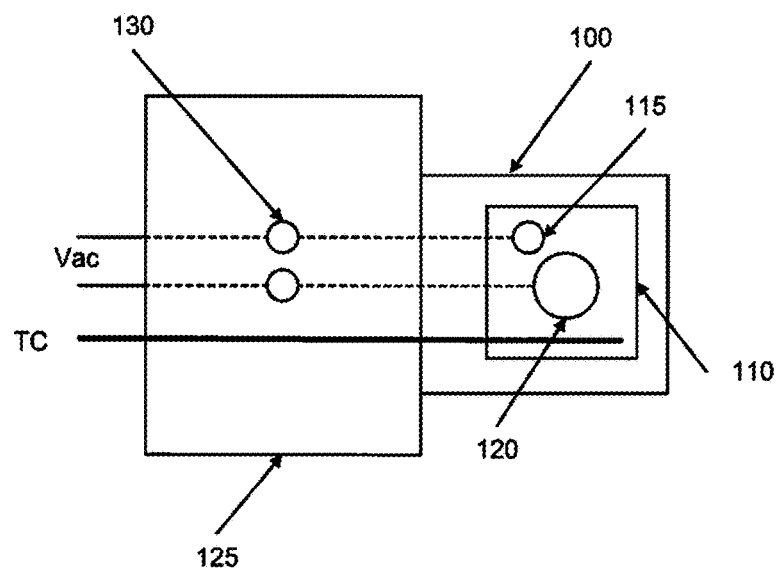
FIG. 1D illustrates a modular apparatus for a capacitive sensor, according to an embodiment of the present invention.

FIG. 1D illustrates a modular apparatus 100 for a capacitive sensor, according to an embodiment of the present invention. In this embodiment, modular apparatus 100 includes a square recess 110 for a two wire pressure sensor (or capacitive sensor). For example, modular apparatus 100 may include a contact cavity 115 and a pressure reference cavity 120 with a buried thermocouple hole TC protruding to square recess 110.

This embodiment also shows that IC block 125 includes two IC holes 130 that connect with voltage terminals $V_{AC}$ that act as a voltage alternating current holes. This configuration allows IC holes 130 to interconnect from the pressure sensor to IC block 125. Depending on the configuration and placement of voltage terminals $V_{AC}$, contact cavity 115, and pressure reference cavity 120, modular apparatus 100 may accept a different type of pressure sensor (e.g., capacitive, magnetic, optical, etc.) in a high temperature environment.

In FIG. 2A, an assembly package 200 includes a metal housing 205 capable of withstanding temperatures higher than 600° C. In other embodiments, housing 205 may be made of a non-metal material capable of withstanding the high temperature. As shown in FIG. 2B, housing 205 may be a cylindrical housing, and may include a slot section 210. However, in other embodiments, housing 205 may be any shape as would be appreciated by a person of ordinary skill in the art. As modular apparatus 230 is inserted into housing 205, an elongated portion 220 of modular apparatus 230 passes through slot section 210 to the other side of housing 205, while larger, elongated portion 220 of modular apparatus 230 is contained in housing 205. It should be appreciated that the length of elongated portion 220 may be any suitable length depending on how deep the modular apparatus 230 is to be inserted into, for example, a spacecraft engine.

The size of slot section 210 of housing 205 is configured to be wide enough such that larger portion 225 of modular apparatus 230 is prevented from passing through slot section 210. This allows the pressure sensor on modular apparatus 230 to be environmentally isolated from where the signal conditioner is located. For example, the pressure sensor is located in the hot zone and the signal conditioner is located in the warm zone. This also prevents gas from escaping the hot zone and entering into the warm zone. Such a configuration allows the signal conditioner to be close to, or within a few millimeters of, the pressure sensor on modular apparatus 230.

To protect the pressure sensor from being impinged upon by particulates flowing in the flow path, an extendable tube 215 is attached to housing 205. Extendable tube 215 also determines the depth of insertion of elongated portion 220 of modular apparatus 230 into the environment. Extendable tube 215 may be threaded, welded, or brazed.

Figure 3A:
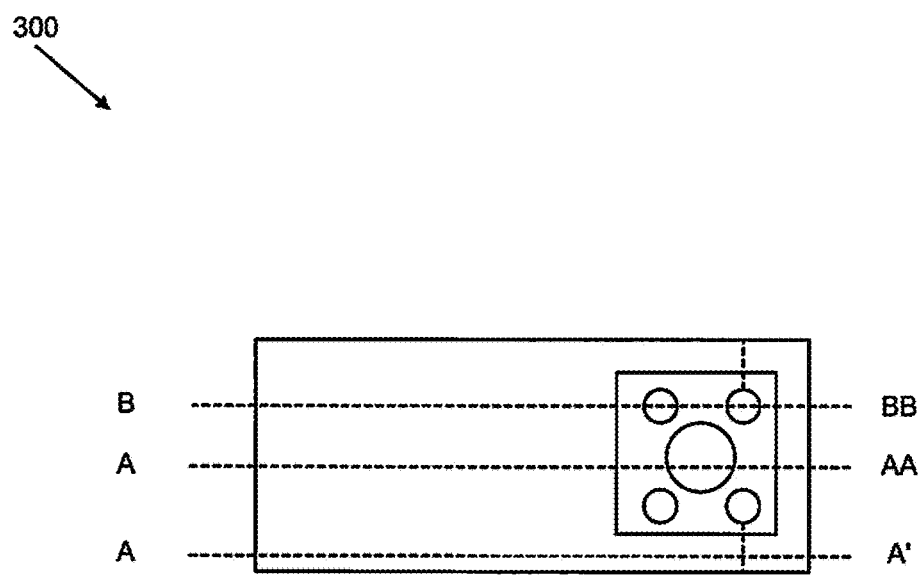
FIG. 3A-D illustrates cross-sections of a modular apparatus, according to an embodiment of the present invention.
Figure 3B:
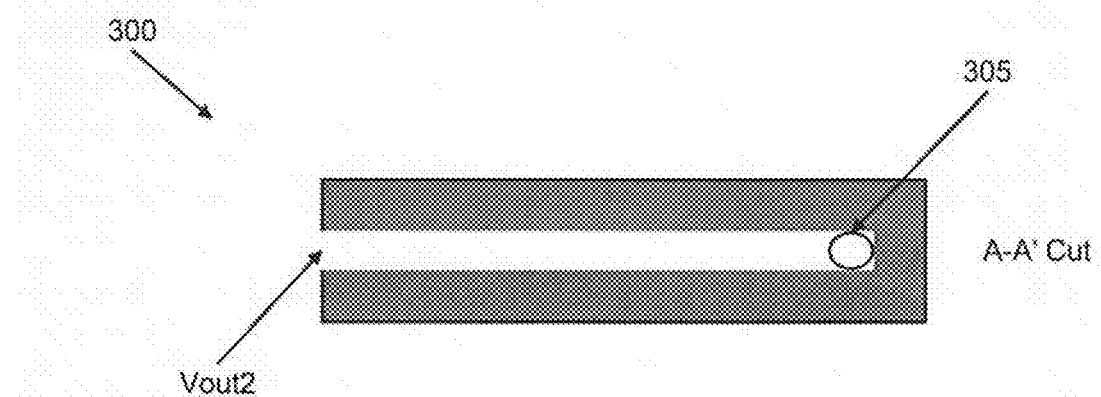
Figure 3C:
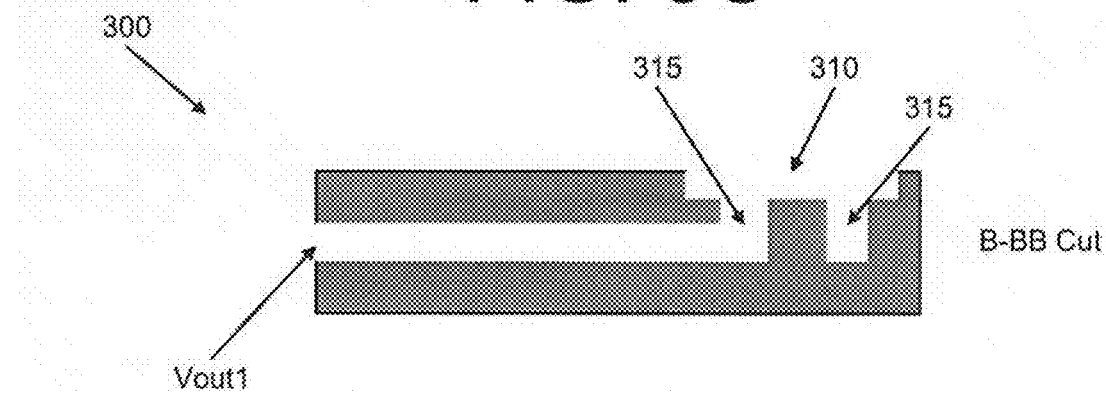
Figure 3D:
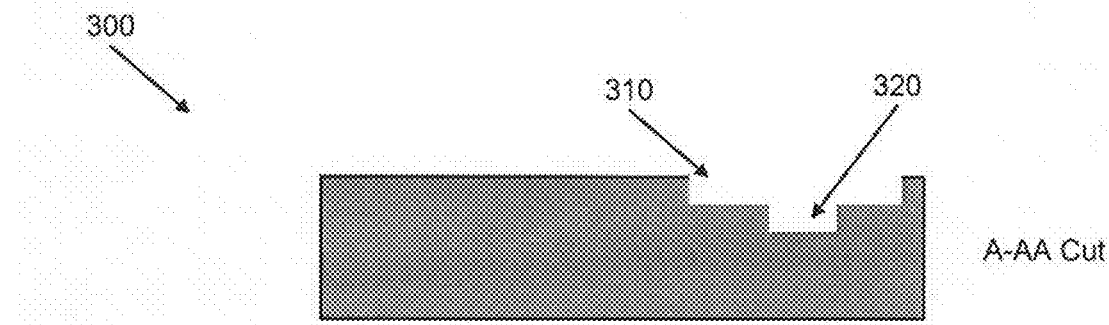

FIG. 3A illustrates a top view, and FIGS. 3B-D illustrate cross-sections, of a modular apparatus 300, according to an embodiment of the present invention. For example, FIG. 3A illustrates 3 cuts, e.g., B-BB cut, A-AA cut, and A-A' cut. These cuts show the various cross-sections in FIGS. 3B-D.

For the cross-section showing the A-AA cut of modular apparatus 300, the relationship of the holes between the square recess 310 and the pressure reference cavity 320 is shown in FIG. 3D. For the cross section showing B-BB cut of modular apparatus 300, the relationship of the holes between square recess 310, contact cavities 315, and the relationship of the holes between voltage out hole $V_{out1}$ and contact cavity 315, as well as the relationship between contact cavity 315 that connects to voltage in hole $V_{in1}$, via access hole 305, are shown in FIG. 3C. For the cross-section showing the A-A' cut of modular apparatus 300, the relationship of the holes between access hole 305 and voltage out $V_{out2}$ is shown in FIG. 3B.

Figure 4A:
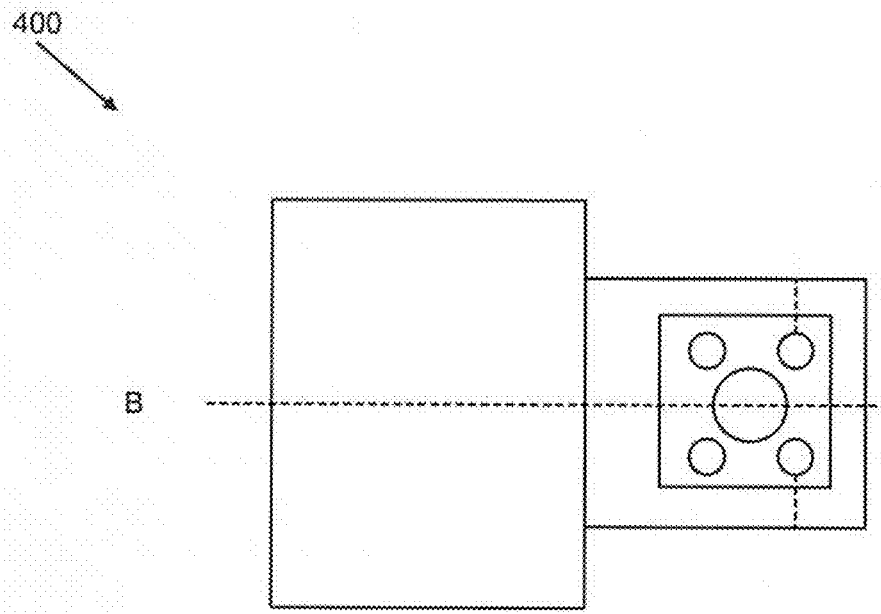
FIG. 4A illustrates a top view.
Figure 4B:
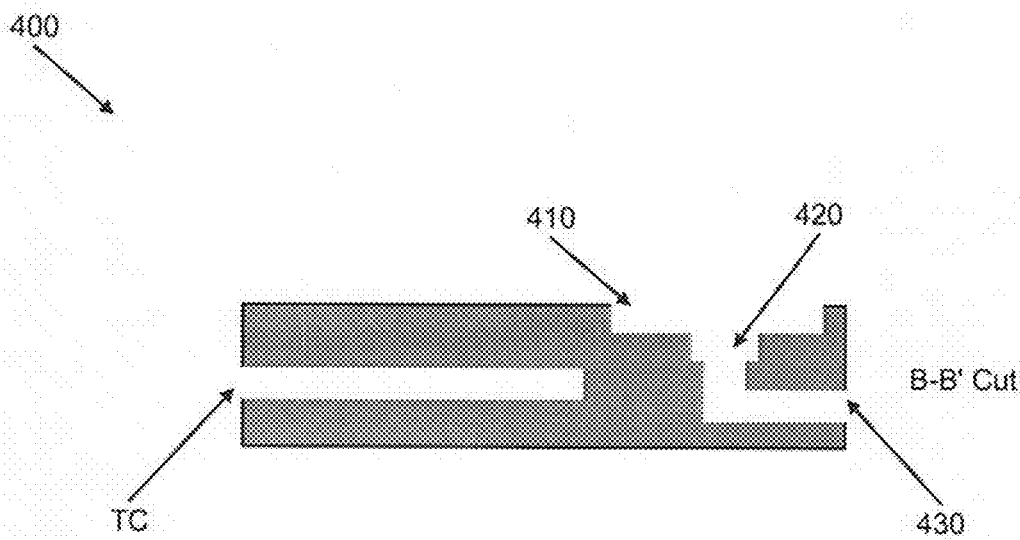
FIG. 4B illustrates a cross-section, of a modular apparatus, according to an embodiment of the present invention.

FIG. 4A illustrates a top view, and FIG. 4B illustrates a cross-section, of modular apparatus 400, according to an embodiment of the present invention. For example, for the cross section showing the B-B' cut of modular apparatus 400, the relationship of the holes between the square recess 410 and the reference cavity 420, as well as the relationship between buried thermocouple TC and reference cavity 420, is shown in FIG. 4B. The relationship between reference cavity 420 and impedance hole 430 is also shown in FIG. 4B.

Impedance hole 430 is configured to act as an acoustic filter, and is configured to expose reference cavity 420 to the environment. The size of impedance hole 430 determines the range of frequency that is to be accepted (or detected) or filtered out. Impedance hole 430 may include a tube in coil form, for example, that acts as additional acoustic filter. The longer the hole, the longer it takes for the pressure to propagate to where the pressure sensor is located. This way, impedance hole 430 allows dynamic sensing by the pressure sensor. It should be appreciated that if modular apparatus 400 does not include impedance hole 430, then the pressure sensor may be configured to detect static pressure.

In certain embodiments, the modular apparatus may be configured to detect dynamic pressure and static pressure. For example, FIG. 5 illustrates a cross-section 500 of a modular apparatus 500, according to an embodiment of the present invention. In this embodiment, modular apparatus 500 include two square recesses 505, 515 that allow two pressure sensors to be attached to modular apparatus 500. Impedance hole 525 is operably connected to pressure reference cavity 510 of square recess 505, such that dynamic pressure can be detected.

In order for static pressure to be detected, pressure reference cavity 520 is not connected to impedance hole 525. However, it should be appreciated that in some embodiments, pressure reference cavity 520 can be connected to impedance hole 525 in order to dynamically detect the pressure. Other embodiments may not include impedance hole 525, so both pressure sensors detect static pressure. To achieve different pressure detections, the placement of square recesses 505, 515 can be in any location as would be appreciated by a person of ordinary skill in the art.

Depending on the configuration, in some embodiments, the pressure sensors can share the same voltage in and out holes or have their own voltage in and out holes. Similarly, if more than one IC unit is attached to modular apparatus 500, the IC units may share the same voltage in and out holes or have their own voltage in and out holes. Modular apparatus 500 may also be configured to include more than one thermocouple hole, such that more than one thermocouple can be attached to modular apparatus 500. It should also be appreciated that each of the above-mentioned components may share the same voltage in hole, but have their own separate output holes.

Figure 6:
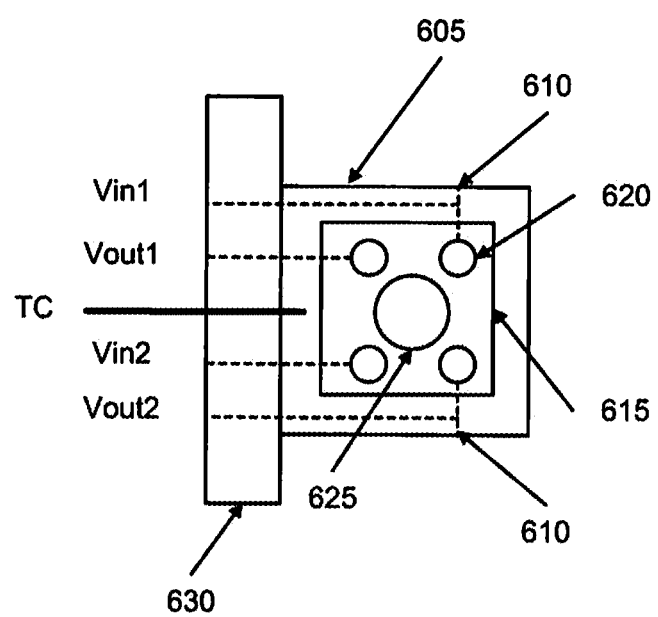
FIG. 6 illustrates a modular apparatus with circular disk, according to an embodiment of the present invention.

FIG. 6 illustrates a modular apparatus 600 with circular disk 630, according to an embodiment of the present invention. In this embodiment, modular apparatus includes an elongated section 605 and a circular section (or larger section) 630. Elongated section 605 and a circular section (or larger section) 630 are a single component in this embodiment. In other embodiments, elongated section 605 and a circular section (or larger section) 630 may be separate components.

Similar to FIG. 1, a first access hole 610 provides voltage in hole $V_{in1}$ with connectivity to contact cavity 620 and a second access hole 610 provides voltage out hole $Vo_{ut2}$ with connectivity to another contact cavity 620. Also, voltage out hole $V_{out1}$ and voltage in hole $V_{in2}$ are directly connected to their respective contact cavities 620. In this embodiment, a pressure sensor can be attached to recess square 615 and allows the pressure sensor to detect the pressure through reference pressure cavity 625.

Circular section 630, which may be a circular disk, allows a conditioning circuit to be attached to the opposite side of elongated section 605, thus making the conditioning circuit orthogonal to the pressure sensor.

Figure 7A:
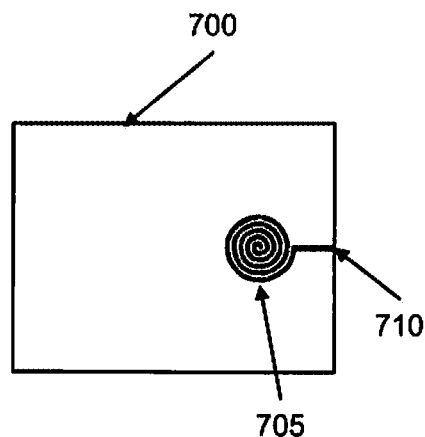
FIGS. 7A and 7B illustrate a modular apparatus with an acoustic filter, according to an embodiment of the present invention.
Figure 7B:
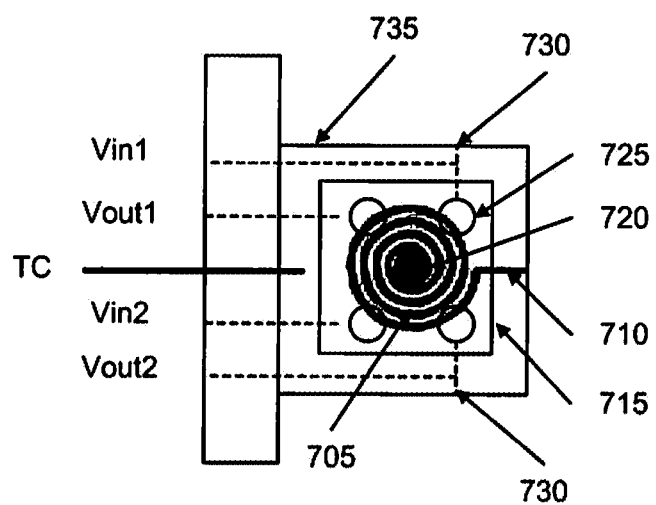

FIG. 7A illustrates a spiral groove 705 fabricated on a structure 700 with a channel inlet 710, according to an embodiment of the present invention. Spiral grove 705 may be separately fabricated in the same material as the elongated structure 735, or material having similar thermomechanical properties (i.e., similar coefficient of thermal expansion). The length and width of the spiral grooved structure 700 may be the same as elongated structure 735. See, for example, FIG. 7B. When grooved structure 700 is attached underneath elongated structure 735, a spiral channel is thus formed. This spiral channel includes one inlet 710 and one outlet 720. Outlet 720 is through the former reference cavity (when used for static sensing). When pressure sensor is attached to square recess 715, outlet 720 allows the pressure sensor to detect the pressure through outlet 720.

Similar to FIG. 1, a first access hole 730 provides voltage in hole $V_{in1}$ with connectivity to contact cavity 725 and a second access hole 730 provides voltage out hole $Vo_{ut2}$ with connectivity to another contact cavity 725. Also, voltage out hole $V_{out1}$ and voltage in hole $V_{in2}$ are directly connected to their respective contact cavities 725.

It will be readily understood that the components of the present invention, as generally described and illustrated in the figures herein, may be arranged and designed in a wide variety of different configurations. Thus, the detailed description of the embodiments of an apparatus, a system, a method, and a computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
    a substrate member comprising a ceramic material, said substrate member having a first face capable of receiving a dynamic pressure sensor and a second face mutually opposing the first face capable of receiving a static pressure sensor;
    at least one recess for receiving the dynamic pressure sensor, the recess located on the first face of the substrate member;
    a reference cavity extending into the substrate member from the recess;
    a plurality of contact cavities extending into the substrate member from the recess;
    at least one voltage input aperture extending within the substrate member between at least one of the plurality of contact cavities and an external surface of the apparatus, wherein the voltage input aperture receives conducting wires to transmit and receive electrical signals to and from the dynamic pressure sensor when the dynamic pressure sensor is attached to the first face; and at least one voltage output aperture extending within the substrate member between another at least one of the plurality of contact cavities and the external surface, wherein the voltage output aperture receives conducting wires to transmit and receive electrical signals to and from the dynamic pressure sensor when the dynamic pressure sensor is attached to the first face, wherein the substrate member comprises an impedance aperture configured to allow the dynamic pressure sensor to detect frequency depending on a size of the impedance aperture.

2. An apparatus, comprising:

a substrate member comprising a ceramic material, said substrate member having a first face capable of receiving a dynamic pressure sensor and a second face mutually opposing the first face capable of receiving a static pressure sensor;

at least one recess for receiving the dynamic pressure sensor, the recess located on the first face of the substrate member;

a reference cavity extending into the substrate member from the recess;

a plurality of contact cavities extending into the substrate member from the recess;

at least one voltage input aperture extending within the substrate member between at least one of the plurality of contact cavities and an external surface of the apparatus, wherein the voltage input aperture receives conducting wires to transmit and receive electrical signals to and from the dynamic pressure sensor when the dynamic pressure sensor is attached to the first face; and at least one voltage output aperture extending within the substrate member between another at least one of the plurality of contact cavities and the external surface, wherein the voltage output aperture receives conducting wires to transmit and receive electrical signals to and from the dynamic pressure sensor when the dynamic pressure sensor is attached to the first face, wherein the substrate member further comprises an impedance aperture comprising a tube configured to allow the dynamic pressure sensor to dynamically detect frequency.

3. An apparatus, comprising:

a substrate member comprising a ceramic material, said substrate member having a first face capable of receiving a dynamic pressure sensor and a second face mutually opposing the first face capable of receiving a static pressure sensor;

at least one recess for receiving the dynamic pressure sensor, the recess located on the first face of the substrate member;

a reference cavity extending into the substrate member from the recess;

a plurality of contact cavities extending into the substrate member from the recess;

at least one voltage input aperture extending within the substrate member between at least one of the plurality of contact cavities and an external surface of the apparatus, wherein the voltage input aperture receives conducting wires to transmit and receive electrical signals to and from the dynamic pressure sensor when the dynamic pressure sensor is attached to the first face;

at least one voltage output aperture extending within the substrate member between another at least one of the plurality of contact cavities and the external surface, wherein the voltage output aperture receives conducting wires to transmit and receive electrical signals to and from the dynamic pressure sensor when the dynamic pressure sensor is attached to the first face; and an impedance aperture extending from an elongated surface of the substrate member and interconnecting the reference cavity to an outside environment of the apparatus.

4. The apparatus of claim 3, wherein the impedance aperture acts as an acoustic filter.

5. The apparatus of claim 4, wherein the size of the impedance aperture determines the range of frequency to be accepted, detected, or filtered out.

* * * * *